May 19, 1942. F. T. HARRINGTON ET AL Re. 22,099

POWER TRANSMISSION

Original Filed Feb. 23. 1938 2 Sheets-Sheet 1

INVENTORS
FERRIS T. HARRINGTON &
RUDOLF E. ESCH
BY Ralph L. Trumbull
ATTORNEY

May 19, 1942. F. T. HARRINGTON ET AL Re. 22,099

POWER TRANSMISSION

Original Filed Feb. 23, 1938 2 Sheets-Sheet 2

INVENTORS
FERRIS T. HARRINTON &
RUDOLF E. ESCH
BY Ralph L. Trueblood
ATTORNEY

Reissued May 19, 1942

Re. 22,099

UNITED STATES PATENT OFFICE 22,099

POWER TRANSMISSION

Ferris T. Harrington, Detroit, Mich., and Rudolf E. Esch, Euclid, Ohio, assignors to Vickers Incorporated, Detroit, Mich., a corporation of Michigan Original No. 2,186,379, dated January 9, 1940, Serial No. 191,894, February 23, 1938. Application for reissue December 11, 1941, Serial No. 422,554

11 Claims. (Cl. 90—33)

This invention relates to power transmissions and more particularly to those of the fluid type wherein a power transmitting fluid, such as oil, and hereinafter referred to as such, is utilized for the transmission of power between one or more pumps and one or more fluid motors.

The invention is particularly concerned with a power transmission system adapted for operating a plurality of hydraulic motors in predetermined sequence and may be used, for example, on a hydraulically operated broaching machine. In the art of surface broaching it has become common to provide dual ram hydraulically operated machines in which one ram descends in a working stroke while the other ram is caused to ascend simultaneously on its return stroke. Machines of this character are frequently provided with work positioning means which operate to advance and withdraw work holding fixtures to and from working position opposite each broaching tool in proper sequence.

It is an object of the present invention to provide a hydraulic power transmission system adapted to operate a machine of this character automatically in cycles of predetermined sequence which repeat themselves continuously until the machine is stopped at will.

Another object is to provide a novel method of maintaining the two rams in step by the provision of improved prefill means for the secondary circuit connecting the return ends of the two main rams.

Further objects and advantages of the present invention will be apparent from the following description, reference being had to the accompanying drawings wherein a preferred form of the present invention is clearly shown.

Figure 2:
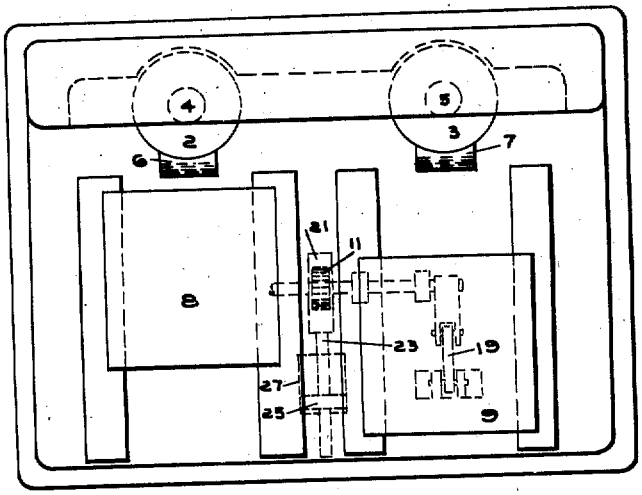
Figure 2 is a top view of a broaching machine, incorporating the transmission of Fig. 1.
Figure 3:
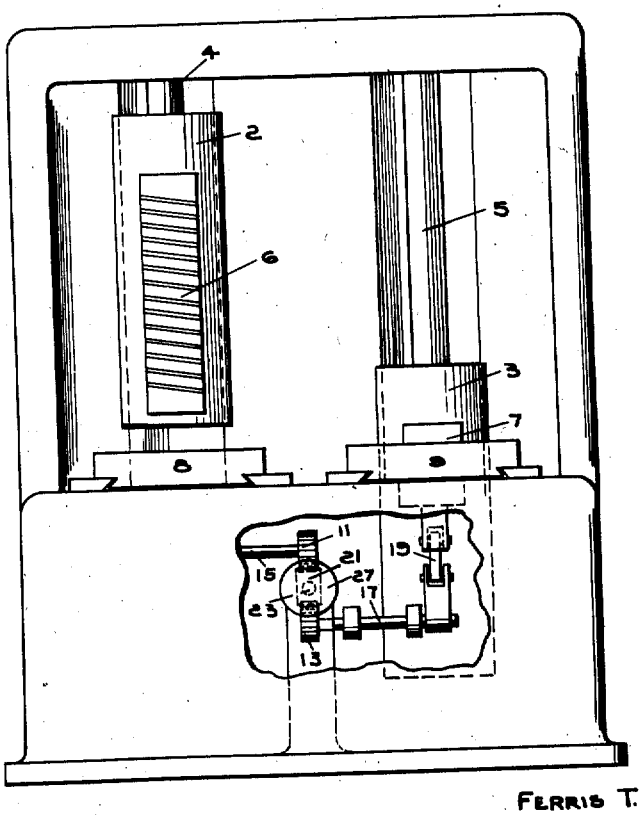
Figure 3 is a front view of the machine shown in Fig. 2.

Referring now to Figures 2 and 3, the broaching machine may comprise a main frame in which are slidably mounted a pair of rams 2 and 3 which are formed as cylinders reciprocable on piston rods 4 and 5. The rams 2 and 3 carry surface broaching tools 6 and 7. Slidably mounted on the table portion of the frame are a pair of work positioning slides 8 and 9 which are actuated oppositely by pinions 11 and 13 connected to shafts 15 and 17. The latter are connected by suitable linkage 19 to the under side of the slides 8 and 9. The pinions 11 and 13 engage a rack 21 which is connected to a piston rod 23 carrying a piston 25 reciprocable in a work shifting cylinder 27.

Figure 1:
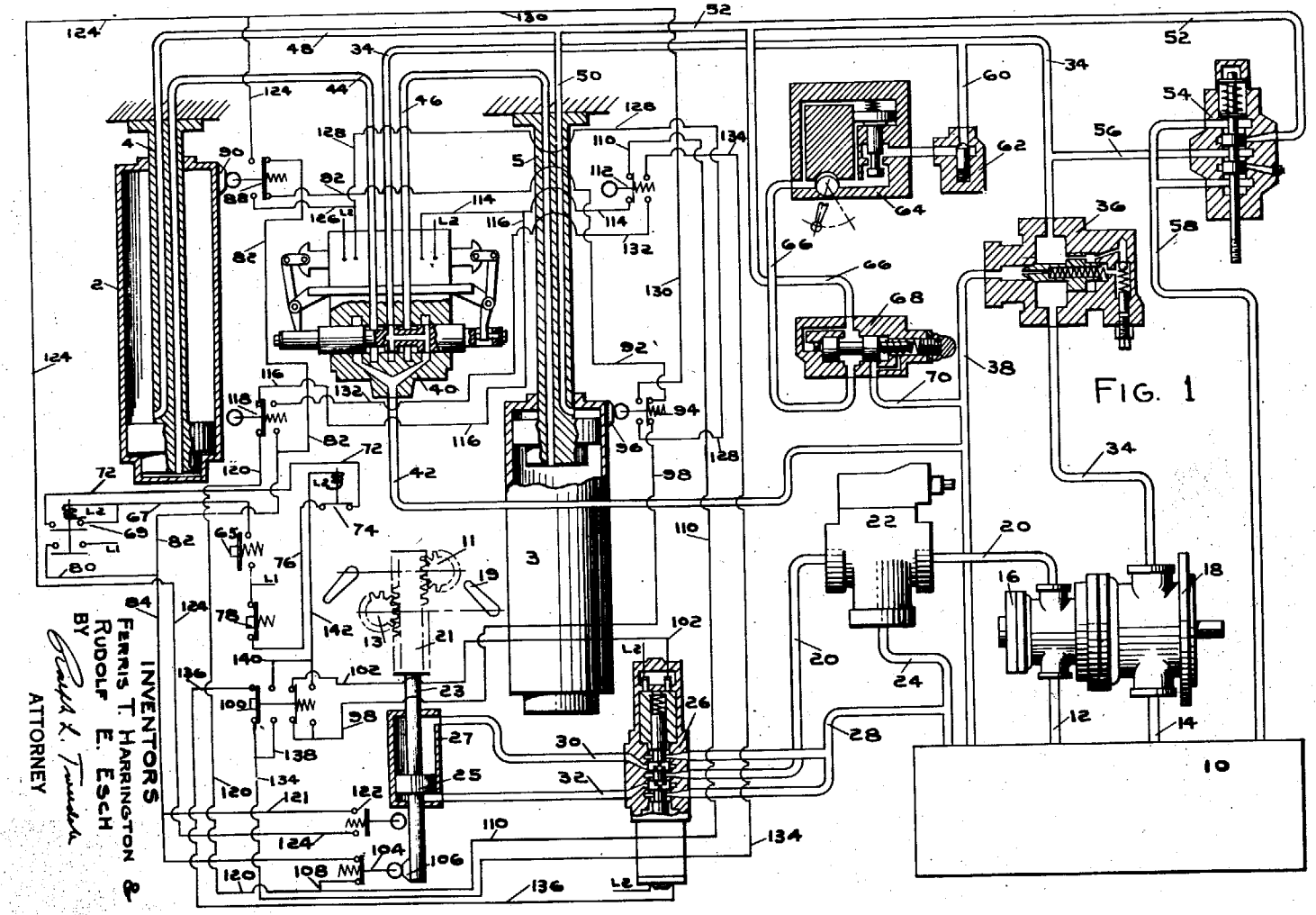
Figure 1 is a diagrammatic view of a hydraulic power transmission system incorporating a preferred form of the present invention.

Referring to Fig. 1 tank 10 contains a supply of oil which may be withdrawn through suction conduits 12 and 14, by a pair of pumps 16 and 18 adapted to be continuously driven by a suitable prime mover, such as an electric motor, not shown.

The pump 16 has a delivery conduit 20 in which a conventional relief valve 22 is inserted for by-passing oil through a conduit 24 to the tank whenever a predetermined pressure is exceeded in the conduit 20. The conduit 20 extends to the pressure port of a solenoid operated, spring centered, open center, four-way valve 26. The latter has its tank ports connected to tank by a conduit 28 and its cylinder ports connected to the opposite ends of cylinder 27 by conduits 30 and 32.

The pump 18 has a delivery conduit 34 in which is inserted a conventional relief valve 36 for by-passing oil to the tank through a conduit 38 whenever a predetermined pressure is exceeded in the conduit 34. The conduit 34 extends to the pressure port of a solenoid operated, spring centered, open center, four-way valve 40, having its tanks port connected to tank by a conduit 42. The cylinder ports of the valve 40 are connected to the head ends of the cylinders 2 and 3 by conduits 44 and 46 respectively.

The rod ends of the cylinders 2 and 3 are connected together in a secondary circuit by conduits 48 and 50 which also communicate with a conduit 52 which extends to one cylinder port of a spring centered, closed center, four-way valve 54. The pressure port of the valve 54 is connected to the discharge conduit 34 of pump 18 by a conduit 56 while the tank ports are connected to tank by a conduit 58. The other cylinder port of valve 54 is plugged. From the discharge conduit 34, a branch conduit 60 extends through a check valve 62 to a hydrostatic flow control valve 64 which is operable to maintain a constant but adjustable rate of flow therethrough in a manner well known in the art. From the valve 64, a conduit 66 extends to a relief valve 68 adapted to by-pass oil to the tank through a conduit 70 whenever a predetermined pressure is exceeded in the conduit 66. From the relief valve 68 the conduit 66 extends to the conduit 52 of the secondary system.

For the purpose of controlling the solenoid valves 26 and 40, an electrical circuit is provided as follows:

A push button starting switch 65, normally open, connects one side of a suitable power line L1 by conductor 67 to the operating coil of a holding relay 69 and to the other side of the line L2. The holding circuit of relay 69 extends by conductor 72 to a normally closed single circuit relay 74, and conductor 76 to an emergency stop switch 78 to line L1. The relay 69 controls a circuit extending from line L1 by conductor 80 to branch conductors 82 and 84. Conductor 82 leads to a double circuit limit switch 88, which is actuated by cam 90 on cylinder 2 whenever it reaches its upward limit of movement. A conductor 92 extends from switch 88 to a double circuit limit switch 94 adapted to close circuit 92 by a cam 96 on cylinder 3 at its lower limit of travel. From switch 94 a conductor 98 extends to a normally closed push button stop switch 100, and thence by a conductor 102 to the upper solenoid of a four-way valve 26 and to line L2.

Branch conductor 84 leads to a single circuit limit switch 104 adapted to be closed by a cam 106 on rod of piston 25 whenever the latter is in its lowermost position. A conductor 108 connects to a conductor 110 which leads to a double circuit limit switch 112 adapted to be opened by cam 96 on cylinder 3 in its uppermost position. A conductor 114 extends from switch 112 to the right hand solenoid of four-way valve 40 and thence to line L2. A conductor 116 leads off of conductor 114 and extends to limit switch 118 which is adapted to be opened by cam 90 on cylinder 2 at its lowest limit of travel. From there a conductor 120 extends to conductors 108 and 110 completing the circuit. A conductor 121 extends from conductor 84 to a limit switch 122 which is adapted to be closed by cam 106 on the rod of piston 25 when the latter is at its upper limit of travel. A conductor 124 extends to limit switch 88, which when closed by lowering of cylinder 2, connects by a conductor 126 to left hand solenoid of four-way valve 40 and thence to line L2. A conductor 128 extends from conductor 126 to limit switch 94, which will close when cylinder 3 rises. A conductor 130 connects limit switch 94 to conductor 124.

From relay 69, conductor 80, conductor 82 also connects to limit switch 118, which will be closed when cylinder 2 has descended. From limit switch 118, a conductor 132 extends to limit switch 112 which is closed by rising of cylinder 3. A conductor 134 extends from switch 112 to push button stop switch 100, from which a conductor 136 extends to the lower solenoid of four-way valve 26 and thence to line L2. From conductor 134, a conductor 138 extends to stop switch 100 whence conductor 140 connects to a conductor 142 and operating coil of relay 74.

In operation with pumps 16 and 18 running and with the starting switch 65 open the solenoids of valves 40 and 26 are deenergized, permitting the valves to spring center and by-pass discharge of the pumps. Starting with the parts in the position shown in the drawings, in which the slide 8 is in working position and the cylinder 2 is ready to start a downward working stroke while the slide 9 is retracted for reloading and the cylinder 3 has completed a working stroke, it will be seen that when starting switch 65 is depressed the upper solenoid of valve 26 will be energized through relay 69, conductor 80, conductor 82, switch 88, conductor 92, switch 94, conductor 98, switch 100 and conductor 102. The valve 26 moves upwardly connecting discharge conduit 20 of the pump 16 to the conduit 30, admitting pressure oil to the upper end of cylinder 27 and holding the piston 25 in its lowermost position as long as the cams 90 and 96 engage the limit switches 88 and 94. A circuit is also established to the right hand solenoid of valve 40 through the relay 69, conductor 80, conductor 84, switch 104, conductor 108, conductor 110, switch 112 and conductor 114. Valve 40 is accordingly shifted to the right to connect the pressure port with conduit 44.

Pressure oil from pump 18 is delivered through conduit 34, valve 40 and conduit 44 to the head end of cylinder 2, causing the latter to move downwardly on the broaching stroke. Oil discharged from the rod end passes through the conduits 48 and 50 to the rod end of cylinder 3, causing the latter to move upwardly in synchronism with the downward movement of cylinder 2. As the cylinder 2 reaches the bottom of its stroke and cylinder 3 reaches the top of its stroke, limit switches 118 and 112 are depressed thus establishing a circuit to the lower solenoid of valve 26. This circuit is through relay 69, conductor 80, conductor 82, switch 118, conductor 132, switch 112, conductor 134, switch 100 and conductor 136. Valve 26, accordingly, moves downwardly, connecting pressure oil to the conduit 32 and causing the piston 25 to move upwardly, retracting the slide 8 and advancing the slide 9. The shifting of both limit switches 112 and 118 also opened the circuit to the right hand solenoid of valve 40, permitting the latter to spring center and by-pass the pump 18.

As the piston 25 reaches its upward limit, cam 106 depresses limit switch 122 to establish a circuit to the left hand solenoid of valve 40 through relay 69, conductor 80, conductor 84, conductor 121, switch 122, conductor 124, switch 88, and conductor 126. Valve 40, accordingly, moves to the left to connect pressure conduit 34 to the conduit 46 to admit pressure oil to the head end of cylinder 3. The latter moves downwardly on a broaching stroke and the oil discharged from the rod end is delivered to the rod end of cylinder 2 through the secondary circuits 48 and 50, causing cylinder 2 to perform a return stroke. At the start of these movements of cylinders 2 and 3, cams 90 and 96 ride off from limit switches 118 and 112, deenergizing the lower solenoid of valve 26, permitting the latter to spring center and by-pass pump 16.

As the cylinders 2 and 3 complete their movements, limit switches 88 and 94 are depressed, again establishing a circuit through relay 69, conductor 80, conductor 82, switch 88, conductor 92, switch 94, conductor 98, switch 100 and conductor 102, to the upper solenoid of valve 26. The latter moves upwardly to admit pressure oil from pump 16 to the conduit 30 and causes piston 25 to move downwardly, retracting slide 9 and advancing slide 8. The shifting of both limit switch 88 and 94 deenergizes the left hand solenoid of the valve 40, permitting the latter to spring center and by-pass pump 18. At the completion of this movement, the parts are restored to the position shown in the drawings, except that relay 69 remains energized so that another cycle takes place immediately and the machine continues in operation through the same cycles, repeatedly.

To stop the machine the push button switch 100 may be depressed. This has the effect of causing the machine to continue in operation until the end of a broaching stroke is reached either with cylinder 2 down or with cylinder 3 down. It will be seen that with switch 100 depressed the first time thereafter that the line 98 or the line 134 is energized for the purpose of normally energizing solenoid valve 26 to shift the work slides; this energization is transferred to the relay 74 and opens the same thus opening the holding circuit 72—76 of relay 69. The latter accordingly opens preventing further energization of either one of the solenoid valves. Thus the machine may be readily brought to rest at the completion of a working stroke on either side.

If it is necessary to stop the machine immediately as in an emergency the emergency stop switch 78 is depressed thus opening the holding circuit of relay 69 instantly and deenergizing both solenoid valves. The latter spring center and by-pass both pumps 16 and 18. The machine is accordingly stopped in whatever position it may happen to be when the switch 78 is opened.

For the purpose of insuring replenishing of the secondary circuit to make up for leakage, the flow control valve 64 may be adjusted to whatever rate is found suitable for given operating conditions so that the proper quantity of oil from the conduit 34 flows through the conduit 60, check valve 62, flow control 64 and conduits 66 and 52 to the secondary system. The relief valve 68 provides for relieving excessive pressure in the secondary system in case the upgoing cylinder gets to the top before the down-going cylinder gets to the bottom.

It will be noted that either solenoid of valve 40 remains energized until both of two conditions are fulfilled. The down-going cylinder must reach bottom and the up-going must reach top before the solenoid valve 40 can be deenergized. The circuit to the right hand solenoid has a parallel branch portion from conductor 114 through conductor 116, switch 118, and conductor 120 to conductor 108 which keeps the solenoid energized if cylinder 3 gets to the top before cylinder 2 gets to the bottom. Likewise the left hand solenoid circuit has a parallel branch portion from conductor 124 through conductor 130, limit switch 94 and conductor 128 to conductor 126. Thus the pump is never by-passed until both cylinders have completed their strokes. Accordingly, pressure is available either to continue downward movement of one cylinder or to continue upward movement of the other cylinder through the prefill feed valve 54 whichever may be required.

The check valve 62 prevents flow of oil out of the secondary system to the tank through conduit 34 and valve 40 when the latter is in spring centered position. The reset valve 54 may be utilized to manually exhaust oil from the secondary system should the same become too full as may happen when adjusting the machine for different set-ups. By pulling the plunger valve 54 downwardly, the conduit 52 is connected to tank through conduit 58 thus permitting oil to discharge from the secondary system. Likewise, if it is desired to quickly make up lost fluid in the secondary system, the valve 54 may be pushed upwardly to connect the secondary system to the pressure conduit 34 through the conduit 56.

While the form of embodiment of the invention as herein disclosed, constitutes a preferred form, it is to be understood that other forms might be adopted, all coming within the scope of the claims which follow.

What is claimed is as follows:

1. In a hydraulic power transmission system the combination of a first fluid motor, a second fluid motor, pump means for supplying pressure fluid to operate said motors, electrically operable control means for selectively by-passing the pump means or causing operation of the first motor in either direction, electrically operable control means for selectively by-passing the pump means or causing operation of the second motor in either direction, an electric circuit operably connected to said control means, a manually operable switch for energizing the control means to start operation of the first motor, switch means operated by the fluid motors for energizing the control means to cause said motors to operate in a predetermined sequence and manually operable means for deenergizing both said control means to cause the pump to be by-passed.

2. In a hydraulic power transmission system the combination of a first fluid motor, a second fluid motor, pump means for supplying pressure fluid to operate said motors, electrically operable means for controlling the delivery of fluid to said motors individually, a first pair of limit switches operated by the first motor at opposite ends of its stroke, a second pair of limit switches operated by the second motor at opposite ends of its stroke, a manually controlled switch, an electric circuit connecting the control means and the switches and arranged when the manual switch is operated to one position to cause repeated operation of said motors through predetermined cycles including a forward stroke of the first motor, a forward stroke of the second motor, a reverse stroke of the first motor and a reverse stroke of the second motor in sequence, and when the manual switch is moved to another position to cut off the delivery of fluid to the motors.

3. In a hydraulic broaching machine of the type having a pair of oppositely movable main slides and an oppositely shiftable work handling member, the combination of a pair of main fluid motors for operating the main slides simultaneously in opposite directions, a second fluid motor for operating the work handling member, a pump for supplying fluid to the main motors, a second pump for supplying fluid to the second motor, electrically operated control valves for selectively controlling the flow of fluid to the motors from their respective pumps, an electric circuit connected to said electrically operated control valves, means for causing operation of said motors in repeated predetermined cycles, said means comprising a plurality of limit switches mechanically operated by said motors and connected in said circuit, and a manually operable switch for controlling said circuit independently of the limit switches.

4. In a hydraulic broaching machine of the type having a pair of oppositely movable main slides, a pair of fluid motors for operating the main slides, a pump for supplying fluid to operate one motor or the other selectively on a working stroke, means for supplying fluid to return each motor while the other is on a working stroke, electrically operated means for controlling the supply of fluid to the motors on their working stroke, an electric circuit connected to said control means, and means including limit switches in said circuit for causing operation of said motors in repeated predetermined cycles and arranged to prevent initiation of a working stroke of a motor before both complete return of the same and completion of the working stroke of the other motor.

5. In a hydraulic broaching machine of the type having a pair of oppositely movable main slides and an oppositely shiftable work handling member, the combination of a pair of main fluid motors for operating the main slides, a second fluid motor for operating the work handling member, a pump for supplying fluid to the main motors to operate one motor or the other selectively on a working stroke, means for supplying fluid to return each main motor while the other is on a working stroke, a second pump for supplying fluid to the second motor, electrically operated control valves for selectively controlling the flow of fluid to the motors from their respective pumps, an electric circuit connected to said electrically operated control valves, and means for causing operation of said motors in repeated predetermined cycles said means comprising a plurality of limit switches mechanically operated by said motors and connected to said circuit, in a manner to prevent operation of the second motor until both motors have completed their respective working and return strokes.

6. In a hydraulic machine of the type having a pair of oppositely movable slides, a pair of piston and cylinder fluid motors for operating the slides, a pump for supplying fluid to operate one motor or the other selectively on a working stroke, means connecting an end of one cylinder to an end of the other cylinder to form a secondary circuit for causing the return of one motor during the working stroke of the other motor, and means for feeding fluid into the secondary circuit continuously at a constant rate to replace leakage.

7. In a hydraulic machine of the type having a pair of oppositely movable slides, a pair of piston and cylinder fluid motors for operating the slides, a pump for supplying fluid to operate one motor or the other selectively on a working stroke, means connecting an end of one cylinder to an end of the other cylinder to form a secondary circuit for causing the return of one motor during the working stroke of the other motor, and means for bleeding fluid from the pump into the secondary circuit continuously to replace leakage, said means comprising a hydrostatic flow rate controlling valve connected between the pump outlet and the secondary circuit.

8. In a hydraulic machine of the type having a pair of oppositely movable slides, a pair of piston and cylinder fluid motors for operating the slides, a pump for supplying fluid to operate one motor or the other selectively on a working stroke, means connecting an end of one cylinder to an end of the other cylinder to form a secondary circuit for causing the return of one motor during the working stroke of the other motor, and means for feeding fluid into the secondary circuit continuously at a constant low rate to replace leakage, and a manually operable valve for at times admitting fluid to the secondary circuit at a high rate.

9. In a hydraulic power transmission system the combination of a pump, a pair of oppositely movable piston and cylinder fluid motors, means connecting one end of each cylinder with the pump, means connecting the other ends of the cylinders together in a secondary circuit for causing movement of one cylinder by fluid discharged from the other cylinder and vice versa, control means for selectively directing pressure fluid from the pump to said one end of either cylinder or by-passing the pump, operating means for said control means, a pilot circuit connected to the operating means, and separate circuit controlling means in said pilot circuit positioned for operation by each motor at each end of its stroke, said pilot circuit being connected to provide interlocking control of said control means whereby the bypassing of the pump is preventing until completion of movement of both motors.

10. In a hydraulic power transmission system the combination of a pump, a pair of oppositely movable piston and cylinder fluid motors, means connecting one end of each cylinder with the pump, means connecting the other ends of the cylinders together in a secondary circuit for causing movement of one cylinder by fluid discharged from the other cylinder and vice versa, control means for selectively directing pressure fluid from the pump to said one end of either cylinder or bypassing the pump, electric operating means for said control means, a pilot circuit connected to the operating means, and separate circuit controlling means in said pilot circuit positioned for operation by each motor at each end of its stroke, said pilot circuit being connected to provide interlocking control of said control means whereby the bypassing of the pump is prevented until completion of movement of both motors.

11. In a hydraulic power transmission system the combination of a pump, a pair of oppositely movable piston and cylinder fluid motors, means connecting one end of each cylinder with the pump, means connecting the other ends of the cylinders together in a secondary circuit for causing movement of one cylinder by fluid discharged from the other cylinder and vice versa, control means including a spring-centered four-way valve for selectively directing pressure fluid from the pump to said one end of either cylinder or bypassing the pump, operating means for said control means, a pilot circuit connected to the operating means, and separate circuit controlling means in said pilot circuit positioned for operation by each motor at each end of its stroke, said pilot circuit being connected to provide interlocking control of said control means whereby the bypassing of the pump is prevented until completion of movement of both motors.

FERRIS T. HARRINGTON.
RUDOLF E. ESCH.